UNITED STATES PATENT OFFICE.

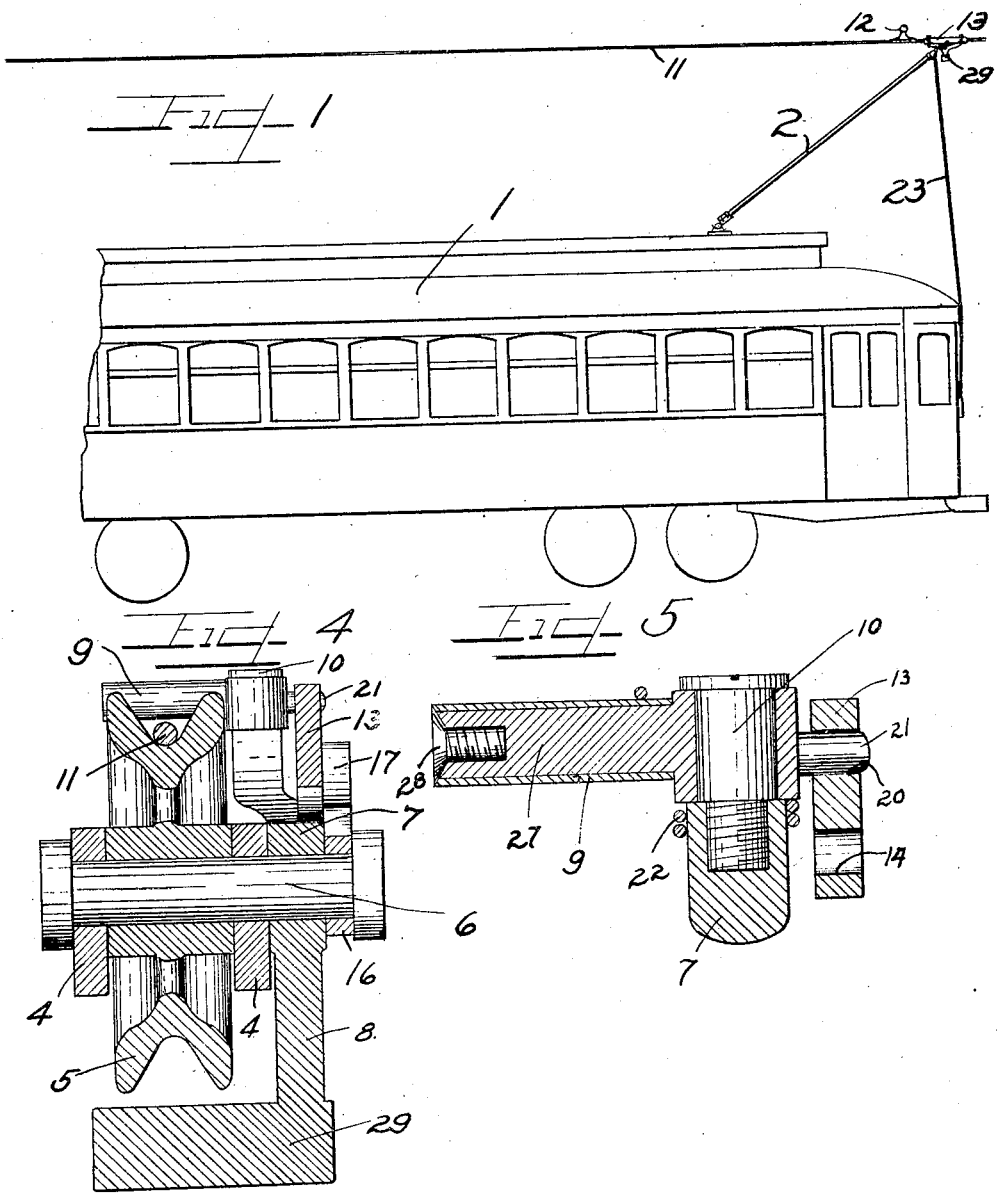

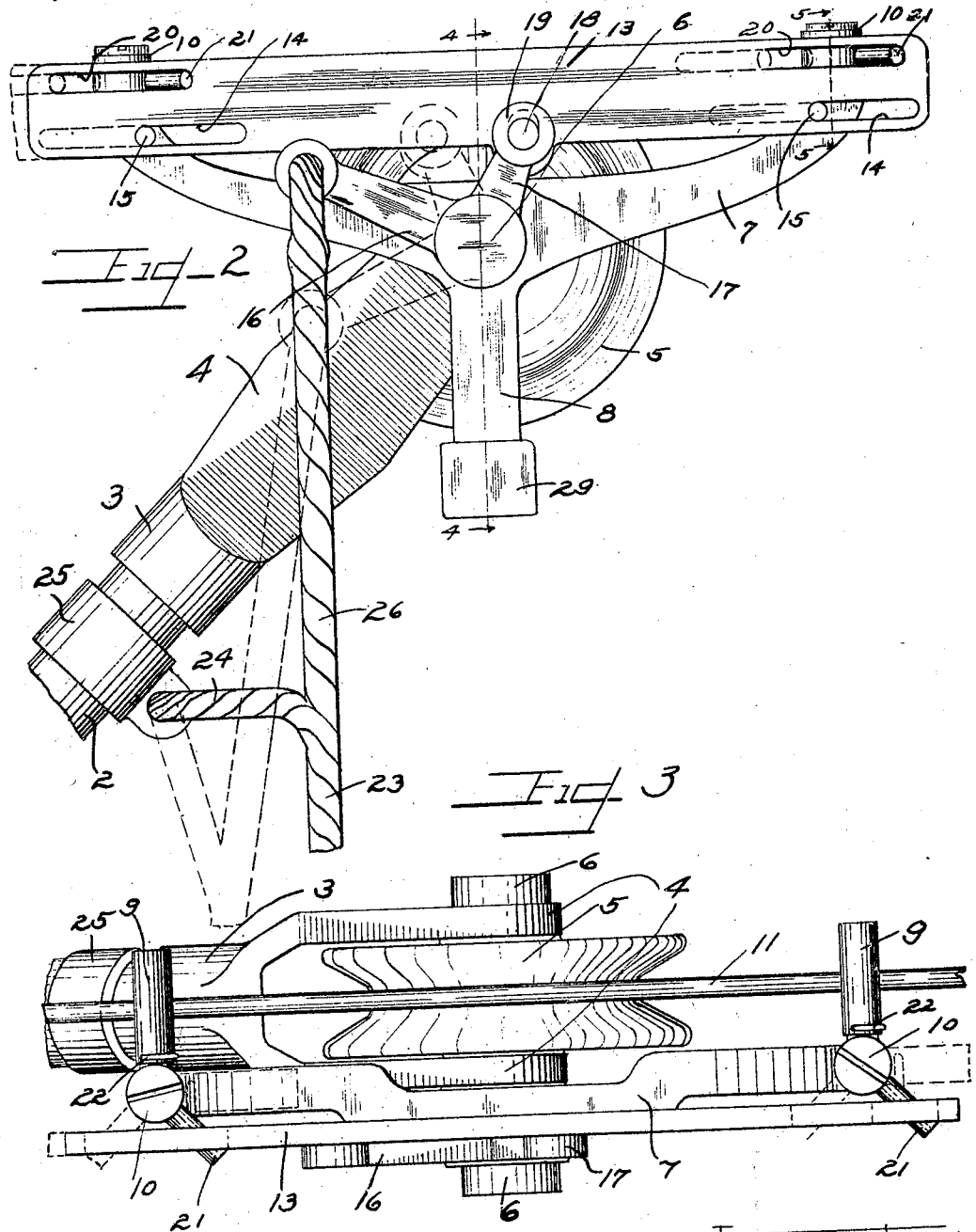

ANTOINETTE A. COHEN, OF BIRMINGHAM, MICHIGAN.

TROLLEY-RETRIEVER.

1,375,034.  Specification of Letters Patent.  Patented Apr. 19, 1921.

Application filed August 11, 1919. Serial No. 316,558.

*To all whom it may concern:*

Be it known that I, ANTOINETTE A. COHEN, a citizen of the United States, and a resident of the city of Birmingham, in the county of Oakland and State of Michigan, have invented certain new and useful Improvements in Trolley-Retrievers; and I do hereby declare that the following is a full, clear, and exact description of the same, reference being had to the accompanying drawings, and to the numerals of reference marked thereon, which form a part of this specification.

This invention relates to devices for preventing the trolley wheel of an electric street car jumping off the trolley wire.

Heretofore devices have been suggested for guiding the trolley wheel back to the wire after it has jumped off.

The object of the present invention, however, is to provide means for preventing the wheel from leaving the wire and therefore avoiding the need for guiding devices and providing much more positive results.

A further object of the invention is to provide a device for preventing upward movement of the trolley wire away from the wheel which will automatically move out of the path of the trolley wire connector and to one side of the trolley wire whenever the trolley rope is pulled to bring the trolley wheel out of contact with the trolley wire.

Other and further important objects of this invention will be apparent from the disclosures in the drawings and specification.

The invention (in a preferred form) is illustrated in the drawings and hereinafter more fully described.

On the drawings:

Figure 1 is a side elevation of a trolley car provided with a trolley retrieving device embodying the features of the present invention.

Fig. 2 is a side elevation of the trolley retrieving device.

Fig. 3 is a plan view of the same.

Fig. 4 is a section on the line 4—4 of Fig. 2.

Fig. 5 is a section on the line 5—5 of Fig. 2.

As shown on the drawings:—

The device is shown attached to a trolley car 1 of usual construction having the ordinary pivotally mounted trolley pole 2.

To the end of this pole is secured the trolley harp 3 between the arms 4 of which the trolley wheel 5 is arranged.

On one side of the harp the axle 6 of the trolley wheel is extended to enable a frame 7 to be journaled thereon.

This frame is provided with a downwardly extending arm 8 carrying a counter weight 29 at its lower end so that irrespective of the angular position of the trolley pole the frame 7 always remains horizontal.

On each end of the frame 7 is a roller or sleeve 9 rotatably mounted on an arm 27 and secured thereto by a screw 28. This arm 27 is arranged to swing about a vertical pin 10 screwed into the upper part of the frame. The rollers 9 are adapted to extend over the trolley wire 11 and hold it in engagement with the trolley wheel. If these rollers were held rigidly over the wire the device would be unable to pass the connectors 12 so that means must be provided for allowing the rollers to move rearwardly and laterally out of the way of the latter and then return to their original trolley wire engaging position.

Further, means must be provided for holding the rollers out of the path of the wire when the trolley is being moved into and out of engagement with the trolley wire.

For these purposes a plate 13 is provided having slots 14 therein for engagement with pins 15 on the ends of the frame 7 so that the plate may slide relatively to the frame within certain limits. This plate is held laterally against the frame by a bell crank 16 journaled on the axle 6, one arm 17 of which bears against the outer face of the plate and is connected thereto by a pin 18 extending into a slot 19 in the plate.

Adjacent the upper edge of this sliding plate slots 20 are provided into which extend pins 21 connected to the arms 9. These slots are of such length and so located that when the sliding plate 13 is in its extreme rearward position and the pins 21 are resting against the rear ends of the slots 20 in the plate 13, as shown in Fig. 3, the rollers 9 extend substantially perpendicularly across the top of the trolley wire. These slots 20 are sufficiently long to allow the rollers 9 to swing through an angle of about 90° without moving the sliding plate, thus allowing the device to slide readily past connectors.

Springs 22 are provided for normally holding the rollers 9 extended over the trolley wire as shown more particularly in Figs. 3 and 5. The upper ends of these springs bear against the rear faces of the rollers 9 while the lower ends are wound around and attached to the upper parts of the frame 7 as shown in Fig. 5.

In order that the rollers 9 may be held out of the path of the trolley wire while the trolley is moved into or out of contact with the trolley wire the trolley rope 23 is connected to the bell-crank 16. For this purpose the end of the rope 23 is forked, one branch 24 being connected to a clamp 25 on the upper end of the trolley arm 2 while the other branch 26 is connected to the free arm of the bell-crank 16. These branches are of such length that a pull on the rope operates the bell-crank through branch 26, thereby sliding the plate 13 forwardly and swinging the rollers 9 to one side of the trolley wire, before the branch 24 connected to the trolley pole is brought into tension.

The operation is as follows:—

When the car is running the normal position of the rollers 9 is that shown in Fig. 3. As soon as one of the connectors 12 of the trolley wire strikes the forward roller 9 it swings it backward and laterally out of the way against the action of the spring 22. This brings the roller into a position such as that shown in dotted lines in Fig. 3 which may be reached without moving the plate 13.

As soon as the connector has moved past the roller the latter swings back into its original position under the action of its spring 22. The same operation takes place when the connector strikes the second roller. Preferably the distance between the rollers is such that the first roller has time to swing back into position over the trolley wire before the second roller has been moved out of the way by the connector so that one or other of the rollers is always in engagement with the trolley wire. This is especially important since the trolley wheel has a greater tendency to jump off the wire when passing a connector than at other times.

When it is desired to bring the trolley wheel out of engagement with the trolley wire the rope 23 is pulled down. The first result is to draw down the free arm of the bell crank 16 by tension in the branch 26 of the rope. This movement causes the other arm 17 of the bell-crank to move forwardly and, by pin 18 acting in slot 19 of the plate 13, the latter is slid forwardly. This movement of the plate 13 relatively to the frame 7 causes the pins 21 passing through the slots 20 in the plate 13 to move from the position shown in full lines to that shown in dotted lines in Fig. 3, thereby throwing the rollers to one side of the trolley wire.

Further pull on the rope causes the branch 24 to come into tension whereupon the trolley pole, harp and wheel are drawn down away from the trolley wire.

I am aware that numerous details of construction may be varied through a wide range without departing from the principles of this invention, and I therefore do not purpose limiting the patent granted otherwise than necessitated by the prior art.

I claim as my invention:—

1. A device of the class described comprising a frame pivotally mounted on a trolley wheel axle, and arranged wholly on one side of the wheel, arms pivotally mounted on the ends of said frame adapted to swing in a horizontal plane over the trolley wire, and a spring for normally holding the arms over the trolley wire, while allowing said arms to swing laterally away from the wire when struck by one of the connectors of the trolley wire.

2. A device of the kind described comprising a trolley harp, a wheel carried thereby, a frame pivotally mounted on the trolley wheel axle, a counterweight on the frame adapted to hold said frame horizontal, an arm on each end of the frame adapted to turn relatively thereto about a yielding means for normally holding said arm over the trolley wire to retain the latter in engagement with the wheel while allowing the arm to swing laterally away from the wire when struck by one of the connectors of the trolley wire, a plate slidably mounted on the frame, having slots therein adjacent each arm, pins connected to said arms extending through said slots whereby movement of the plate causes said arms to swing away from the trolley wire, a bell-crank pivotally mounted on the trolley wheel axle having one arm connected to the sliding plate, and a forked rope having one branch connected to the pole and the other branch connected to the other arm of the bell-crank, the respective lengths of the two branches being such that when the rope is pulled the bell-crank is operated to slide the plate relatively to the frame before the branch connected to the pole is brought into tension.

3. A device of the kind described comprising a trolley harp, a wheel carried thereby, two independently movable trolley wire engaging members carried thereby, yielding means for holding said members in engagement with the wire, means for simultaneously moving said members out of engagement with said wire, a forked rope having one branch connected to the pole and the other branch connected to said last-mentioned means, the respective lengths of the two branches being such that when the rope is pulled the means for moving said members are operated before the branch connected to the pole is brought into tension.

4. A device of the kind described comprising a trolley harp, a wheel carried thereby, two arms carried by the harp adapted to swing between a position perpendicular to and over the trolley wire to hold the latter in engagement with the trolley wheel and a position parallel to the trolley wire, yielding means for normally holding the arms in the perpendicular position and means acting in opposition thereto for swinging the arms into the parallel position to allow the wheel to be brought into and out of engagement with the trolley wire and a forked rope having one branch connected to the pole and the other branch connected to said last mentioned means, the respective lengths of the two branches being such that when the rope is pulled the last-mentioned means are operated before the branch connected to the pole is brought into tension.

5. A device of the class described comprising a frame pivotally mounted on a trolley wheel axle, and lying wholly on one side of such wheel, and a roller arm carried by the frame adapted to extend over the trolley wire to retain the latter in engagement with the wheel, said arm being adapted to swing on a vertical axis when struck by one of the connectors of the trolley wire.

In testimony whereof I have hereunto subscribed my name in the presence of two subscribing witnesses.

ANTOINETTE A. COHEN.

Witnesses:
 THOS. H. COBB,
 A. H. COHEN.